(12) United States Patent
Jones et al.

(10) Patent No.: US 7,380,031 B2
(45) Date of Patent: May 27, 2008

(54) HYBRID DATA DISTRIBUTION SYSTEMS

(75) Inventors: Jackson Jones, Sunnyvale, CA (US);
David Simpson, San Jose, CA (US);
Brian Barnett, Oakland, CA (US);
John W. Norris, III, San Francisco, CA (US)

(73) Assignee: LodgeNet Interactive Corporation, Sioux Falls, ND (US)

( * ) Notice: Subject to any disclaimer, the term of this patent is extended or adjusted under 35 U.S.C. 154(b) by 18 days.

(21) Appl. No.: 11/314,915

(22) Filed: Dec. 21, 2005

(65) Prior Publication Data

US 2007/0022237 A1 Jan. 25, 2007

Related U.S. Application Data

(63) Continuation of application No. PCT/US2004/020291, filed on Jun. 23, 2004.

(60) Provisional application No. 60/480,407, filed on Jun. 23, 2003.

(51) Int. Cl.
*G06F 13/12* (2006.01)

(52) U.S. Cl. ............ 710/69; 710/70; 710/72; 725/78; 725/80

(58) Field of Classification Search ............ None
See application file for complete search history.

(56) References Cited

U.S. PATENT DOCUMENTS

| 5,515,511 | A | | 5/1996 | Nguyen et al. | |
|---|---|---|---|---|---|
| 5,521,631 | A | * | 5/1996 | Budow et al. | 725/78 |
| 5,847,751 | A | | 12/1998 | Safadi | |
| 5,892,535 | A | | 4/1999 | Allen et al. | |
| 2004/0250273 | A1 | * | 12/2004 | Swix et al. | 725/25 |

* cited by examiner

*Primary Examiner*—Alford Kindred
*Assistant Examiner*—Eron Sorrell
(74) *Attorney, Agent, or Firm*—Kinney & Lange, P.A.

(57) ABSTRACT

A hybrid data distribution system includes a modulator coupled to an analog device, one or more processors coupled to the modulator, and a database coupled to the one or more processors. The database is configured to store encoded data. The system also includes an Ethernet switch for transmitting the encoded data to a digital device. The Ethernet switch is coupled to each of the database and the digital device. Moreover, the one or more processors are configured to directly or indirectly obtain the encoded data from the database, decode the encoded data, and directly or indirectly transmit the decoded data to the modulator. The modulator is configured to transmit the decoded data to the analog device, and the Ethernet switch is configured to directly or indirectly obtain the encoded data from the database, and to transmit the encoded data to the digital device.

6 Claims, 1 Drawing Sheet

HYBRID DATA DISTRIBUTION SYSTEMS

CROSS REFERENCE TO RELATED APPLICATION

This application is a continuation of International Application Serial No. PCT/US04/020291, filed Jun. 23, 2004, published Jan. 6, 2005, which claims priority from U.S. patent application Ser. No. 60/480,407, filed Jun. 23, 2003, each of which are incorporated by reference in their entireties herein, and from which priority is claimed.

BACKGROUND OF THE INVENTION

The present invention relates generally to hybrid data distribution systems. In particular, the present invention is directed towards hybrid data distribution systems including a database for storing encoded data, in which the system is configured to transmit the encoded data to a digital device, and to decode the encoded data and transmit the decoded data to an analog device.

Known cable systems used by cable providers include a data distribution system. Specifically, the cable provider has a first plurality of customers which receive digital cable, and a second plurality of customers which receive analog cable. The customers receiving digital cable have a digital device, such as a digital set top box, electrically connected to their television, and the customers receiving analog cable have an analog device, such as a television commander, electrically connected to their television.

The analog device is configured to receive decoded (non-encoded) data from the cable provider's data distribution system. Specifically, the cable provider's data distribution system stores encoded data, and is configured to decode the data and to transmit the decoded data to the analog device. Such decoded data may be associated with television programs which the analog cable customer may view. Nevertheless, such decoded data does not include an interactive item selection system. After the analog device receives the decoded data, the analog device displays the decoded data on a viewing surface of the television.

The digital device includes a processor and is configured to receive encoded data from the cable provider's data distribution system. Such encoded data may be associated with an interactive item selection system, movies viewable after the digital cable customer selects a movie from the interactive item selection system, television programs, or the like. After the digital device receives the encoded data, the digital device decodes the encoded data, and displays the decoded data on the viewing surface of the television. Receiving encoded data from the cable provider's data distribution system allows the digital device to receive more data without increasing the amount of bandwidth relative to the amount of data received by the analog device. Consequently, the quality of the picture and/or the sound of the data received by the digital device is superior in comparison to the quality of the picture and/or the sound of the data received by the analog device.

Nevertheless, in such known cable systems, the analog cable customer is not able to receive an interactive item selection system and to select items from the item selection system for viewing, such as movies. Using the known cable systems, to allow both the digital cable customers and the analog cable customers to receive and use the interactive item selection system, the cable provider would have to purchase both digital hardware and analog hardware and set them up side-by-side. This would result in duplicate storage of the data, i.e., the analog and the digital data distribution systems would both store the data, which would reduce cost efficiency. Moreover, separate billing software would have to be used by the analog and digital data distribution systems for analog cable customers and digital cable customers, respectively.

Known hotel video on-demand systems are used to provide a hotel guest with an user-friendly interface for selecting movies and other audio-visual products. Such video on-demand systems include a data distribution system electrically connected to an analog device, and the analog device is electrically connected to a television in the hotel guest's room. The analog device is configured to receive decoded (non-encoded) data from the data distribution system. Specifically, the data distribution system stores encoded data, and is configured to decode the data and to transmit the decoded data to the analog device. Such decoded data may be associated with movies, television programs, item selection systems, or the like. After the analog device receives the decoded data, the analog device displays the decoded data on a viewing surface of the television.

Nevertheless, in order to offer the hotel guest encoded (digital) data using such known hotel video on-demand systems, a significant number of analog channels would have to be sacrificed, thereby reducing the number of channels available to the hotel guest.

SUMMARY OF THE INVENTION

Therefore, a need has arisen for data distribution systems which overcome these and other short comings of the related art. An advantage of the present invention is that in a cable system, a single, hybrid data distribution system may be used to transmit both encoded (digital) data including an interactive item selection system, and decoded (analog) data including the interactive item selection system, to the cable provider's customer. Specifically, a single, hybrid data distribution system may be used to transmit the encoded data to the digital cable customers, and to transmit the decoded data to the analog cable customers. Moreover, the billing system used for digital cable customers may be the same as the billing system used for analog cable customers.

Another advantage of the present invention is that in a hotel video on-demand system, a single, hybrid data distribution system may be used to transmit encoded (digital) data including the interactive item selection system, and decoded (analog) data including the interactive item selection system, to the hotel guests. For example, some rooms at the hotel, such as hotel suite rooms, may have a digital device electrically connected to the television in the room, and other rooms at the hotel, such as non-hotel suite rooms, may have an analog device electrically connected to the television in the room. Moreover, a single, hybrid data distribution system may be used to transmit encoded data to the hotel guests staying in the suites, and to transmit decoded data to the hotel guests staying in non-suite rooms.

According to an embodiment of the present invention, a hybrid data distribution system includes a modulator electrically connected to an analog device, one or more processors electrically connected to the modulator, and a database electrically connected to the one or more processors. The database is configured to store encoded data, and the encoded data includes an interactive item selection system. The system also includes an Ethernet switch, a cable modem, a wireless transmitter, or the like (hereinafter referred to as the "digital transmitter") for transmitting the encoded data to a digital device. The digital transmitter is electrically connected to each of the database and the digital device.

Moreover, the one or more processors are configured to directly or indirectly obtain the encoded data from the database, decode the encoded data, and directly or indirectly transmit the decoded data to the modulator. The modulator is configured to transmit the decoded data to the analog device, and the digital transmitter is configured to directly or indirectly obtain the encoded data from the database, and to transmit the encoded data to the digital device.

For example, the analog device may be electrically connected to a first viewing surface and may be configured to display the decoded information received from the modulator on the first viewing surface. Similarly, the digital device may be electrically connected to a second viewing surface. The digital device may be configured to decode the encoded data received from the digital transmitter, and to display the decoded information on the second viewing surface.

In another embodiment, the system also may include billing software electrically connected to the processor. The billing software may be configured to generate a first bill associated with the transmission of the encoded data from the digital transmitter to the digital device, and a second bill associated with the transmission of the decoded data from the modulator to the analog device. Consequently, the same billing software may be used to charge both the digital customers/users and the analog customers/users.

Other objects, features, and advantages will be apparent to persons of ordinary skill in the art from the following detailed description of the invention and the accompanying drawing.

BRIEF DESCRIPTION OF THE DRAWINGS

For a more complete understanding of the present invention, the needs satisfied thereby, and the objects, features, and advantages thereof, reference now is made to the following description taken in connection with the accompanying drawing.

DETAILED DESCRIPTION OF PREFERRED EMBODIMENTS

Figure 1:
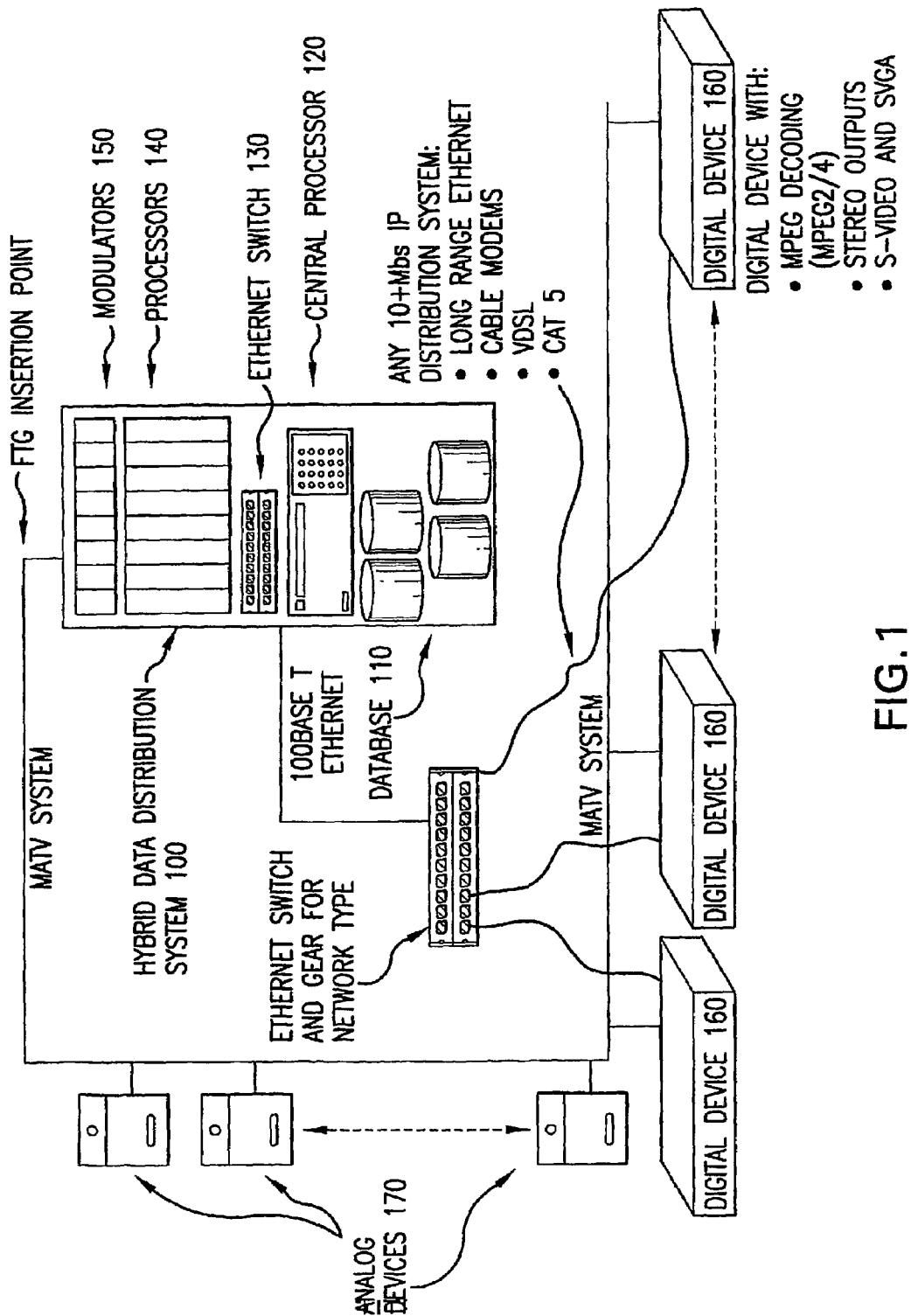
FIG. 1 is a schematic diagram of a hybrid data distribution system according to an embodiment of the present invention.

Referring to FIG. 1, a hybrid data distribution system 100 is depicted. Hybrid data distribution system 100 may be used in a cable system, a hotel video-on-demand system, or the like. System 100 may include a modulator 150 electrically connected to an analog device 170. For example, analog device 170 may be a television commander electrically connected to a television (not shown). Hybrid data distribution system 100 also may include one or more processors electrically connected to modulator 150. For example, the one or more processors may include a central processor 120 and a plurality of processors 140.

Hybrid data distribution system 100 also may include a database 110 electrically connected to the one or more processors. For example, database 110 may be electrically connected to central processor 120 and/or processors 140. Database 110 may be configured to store encoded data, and the encoded data includes information associated with an interactive item selection system (not shown).

For example, the interactive item selection system may include a first menu projected in a first menu space, and a second menu projected in a second menu space, such that a user of the interactive item selection system may simultaneously view first menu and second menu. The first menu may include at least one item. For example, a first item may correspond to "internet," a second item may correspond to "games," a third item may correspond to "movies," a fourth item may correspond to "local information," and a fifth item may correspond to "hotel information and/or services." The first menu also may include a cursor, such as a hotspot indicator, for selecting one of the items in the first menu. In the present invention, a cursor is defined as any indicator, such as a visual indicator, showing or otherwise indicating the user's current location or position within the interactive item selection system.

The second menu may include at least one item associated with one of the items in the first menu. Specifically, the cursor may be positioned adjacent to or may surround a particular one of the items in the first menu, and the items listed in the second menu may be associated with this particular item. The item which the cursor is positioned adjacent to or surrounds is hereinafter referred to as the "focus item."

When the "focus item" correspond to "games," each of the items in the second menu may correspond to a different type of gaming system. For example, a first item of the second menu may correspond to "Playstation® II," manufactured by Sony Computer Entertainment Inc., which has a principle place of business in San Mateo, Calif., "Nintendo® 64," manufactured by Nintendo of America, Inc., which has a principle place of business in Redmond, Wash., or the like. The user of the item selection system then may use the item selection system to select a particular game which they wish to play. When the "focus item" correspond to "movies," each of the items in the second menu may correspond to a different type of movie. For example, the first item of the second menu may correspond to "action movies." The user of the item selection system then may use the item selection system to select a particular movie which they wish to view.

System 100 also may include an Ethernet switch, a cable modem, a wireless transmitter, or the like (hereinafter referred to as the "digital transmitter 130") for transmitting the encoded data to a digital device 160, such as a digital set top box electrically connected to a television. Digital transmitter 130 may be electrically connected to each of database 110 and digital device 160.

Moreover, the one or more processors may be configured to directly or indirectly obtain the encoded data from database 110, decode the encoded data, and directly or indirectly transmit the decoded data to modulator 150. Modulator 150 may be configured to transmit the decoded data to analog device 170. Moreover, digital transmitter 130 may be configured to directly or indirectly obtain the encoded data from database 110, and to transmit the encoded data to digital device 160. As such, database 110 is a shared database, and is used in the transmission of both encoded and decoded data to digital device 160 and analog device 170, respectively.

For example, analog device 170 may be electrically connected to a first viewing surface, such as a television, and may be configured to display the decoded information received from modulator 150 on the first viewing surface. Similarly, digital device 160 may be electrically connected to a second viewing surface, such as a television. Digital device 160 may be configured to decode the encoded data received from digital transmitter 130, and to display the decoded information on the second viewing surface. Consequently, both analog cable customers and digital cable customers may receive the interactive item selection system from the same data distribution system.

In another embodiment, the system also may include billing software (not shown) electrically connected to the one or more processors. The billing software may be configured to generate a first bill associated with the transmission of the encoded data from digital transmitter 130 to digital device 160, and a second bill associated with the transmission of the decoded data from modulator 150 to analog device 170. Consequently, the same billing software may be used to charge both customers/users receiving digital data and customers/user receiving analog data.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are consider exemplary only, with the true scope of the invention indicated by the following claims.

What is claimed is:

1. A hybrid data distribution system for transmitting encoded data to a digital device and for transmitting decoded data to an analog device, comprising:
    a database for storing the encoded data therein, wherein the encoded data comprises information associated with an interactive item selection system;
    at least one processor coupled to the database for accessing the encoded data from the database and for decoding the encoding data to generate decoded data;
    a modulator coupled to the at least one processor for receiving the decoded data from the at least one processor and for transmitting the decoded data in analog form to the analog device;
    means for transmitting the encoded data in digital form to the digital device, wherein the means for transmitting the encoded data to the digital device is coupled to each of the database and the digital device;
    wherein the analog device is coupled to a first television and is configured to display the decoded information received from the modulator on the first viewing surface; and
    wherein the digital device is coupled to a second television and is configured to:
        decode the encoded data received from the means for transmitting; and
        display the decoded information on the second television.

2. The system of claim 1, wherein the at least one processor comprises:
    a first plurality of processors; and
    a central processor, wherein the first plurality of processors are configured to decode a first type of encoded data, and the central processor is configured to decode a second type of encoded data.

3. The system of claim 2, wherein the first type of encoded data comprises an item selection system for viewing by a user of the first viewing surface, and the second type of encoded data comprises at least one movie for viewing by the user of the first viewing surface.

4. The system of claim 1, wherein the means for transmitting comprises at least one of an Ethernet switch, a cable modem, and a wireless transmitter.

5. The system of claim 1, further comprising billing software coupled to the at least one processor, wherein the billing software is configured to generate a first bill associated with the transmission of the encoded data from the means for transmission to the digital device, and a second bill associated with the transmission of the decoded data from the modulator to the analog device.

6. A hybrid data distribution system for transmitting encoded data to a digital device and for transmitting decoded data to an analog device, comprising:
    a modulator coupled to an analog device that is coupled to a first television;
    at least one processor coupled to the modulator;
    a database coupled to the at least one processor, wherein the database is configured to store encoded data, and the encoded data comprises information for an interactive item selection system; and
    means for transmitting the encoded data to a digital device that is coupled to a second television;
    wherein the means for transmitting is coupled to each of the database and the digital device, and the at least one processor is configured to:
        directly or indirectly obtain the encoded data from the database;
        decode the encoded data; and
        directly or indirectly transmit the decoded data to the modulator, and
    wherein the modulator is configured to transmit the decoded data in analog form to the analog device, and the means for transmitting is configured to:
        directly or indirectly obtain the encoded data from the database; and
        transmit the encoded data in digital form to the digital device.

* * * * *